United States Patent [19]

Nevola

[11] Patent Number: 5,058,904
[45] Date of Patent: Oct. 22, 1991

[54] SELF-CONTAINED SEALING RING ASSEMBLY

[75] Inventor: Charles Nevola, Cranston, R.I.
[73] Assignee: EG&G Sealol Inc., Providence, R.I.
[21] Appl. No.: 482,486
[22] Filed: Feb. 21, 1990
[51] Int. Cl.$^5$ .............................................. F16J 15/54
[52] U.S. Cl. .......................................... 277/44; 29/235; 29/450; 277/9.5; 277/11; 277/142; 277/157
[58] Field of Search .................... 277/38, 40, 44, 45, 277/47, 48, 50, 51, 81 R, 81 S, 84, 85, 91, 94, 136, 137, 142, 154, 199, 217, 1, 9.5, 11, 35, 39, 46, 96.1, 151, 157; 415/174.3, 230, 231; 29/235, 450

[56] References Cited

U.S. PATENT DOCUMENTS

| | | | |
|---|---|---|---|
| 1,292,101 | 1/1919 | Shaw | 277/217 |
| 2,334,349 | 11/1943 | Mike | 277/47 |
| 2,867,458 | 1/1959 | Kroekel | 277/142 X |
| 2,908,516 | 10/1959 | Stein | 277/142 X |
| 3,193,298 | 7/1965 | Voitik et al. | 277/40 |
| 3,405,948 | 10/1968 | Junker | 277/137 |
| 3,430,967 | 3/1969 | Junker | 277/137 |
| 3,575,424 | 4/1971 | Taschenberg | 277/154 X |
| 3,844,572 | 10/1974 | Parker | 277/154 X |
| 3,947,944 | 4/1976 | Washington | 277/1 X |
| 4,082,296 | 4/1978 | Stein | 277/96.1 |
| 4,304,408 | 12/1981 | Greenwalt | 277/48 X |
| 4,384,727 | 5/1983 | Junker | 277/137 |
| 4,389,051 | 6/1983 | Mullaney | 277/81 R X |
| 4,519,582 | 5/1985 | Freeman | 277/50 X |
| 4,943,069 | 7/1990 | Jinnouchi | 277/142 X |

Primary Examiner—William A. Cuchlinski, Jr.
Assistant Examiner—Scott Cummings
Attorney, Agent, or Firm—Finnegan, Henderson, Farabow, Garrett & Dunner

[57] ABSTRACT

A segmented carbon seal assembly for mounting into a machined housing around an application runner includes a segmented carbon seal ring, and an annular outer shell radially outside and surrounding the segmented seal, an annular retainer plate retained by the outer shell, drive lugs formed in the outer diameter of the outer shell for mating with the machine and fingers extending from the outer shell into the segmented seal and springs extending from the seal ring and pressing against the retainer plate.

6 Claims, 4 Drawing Sheets

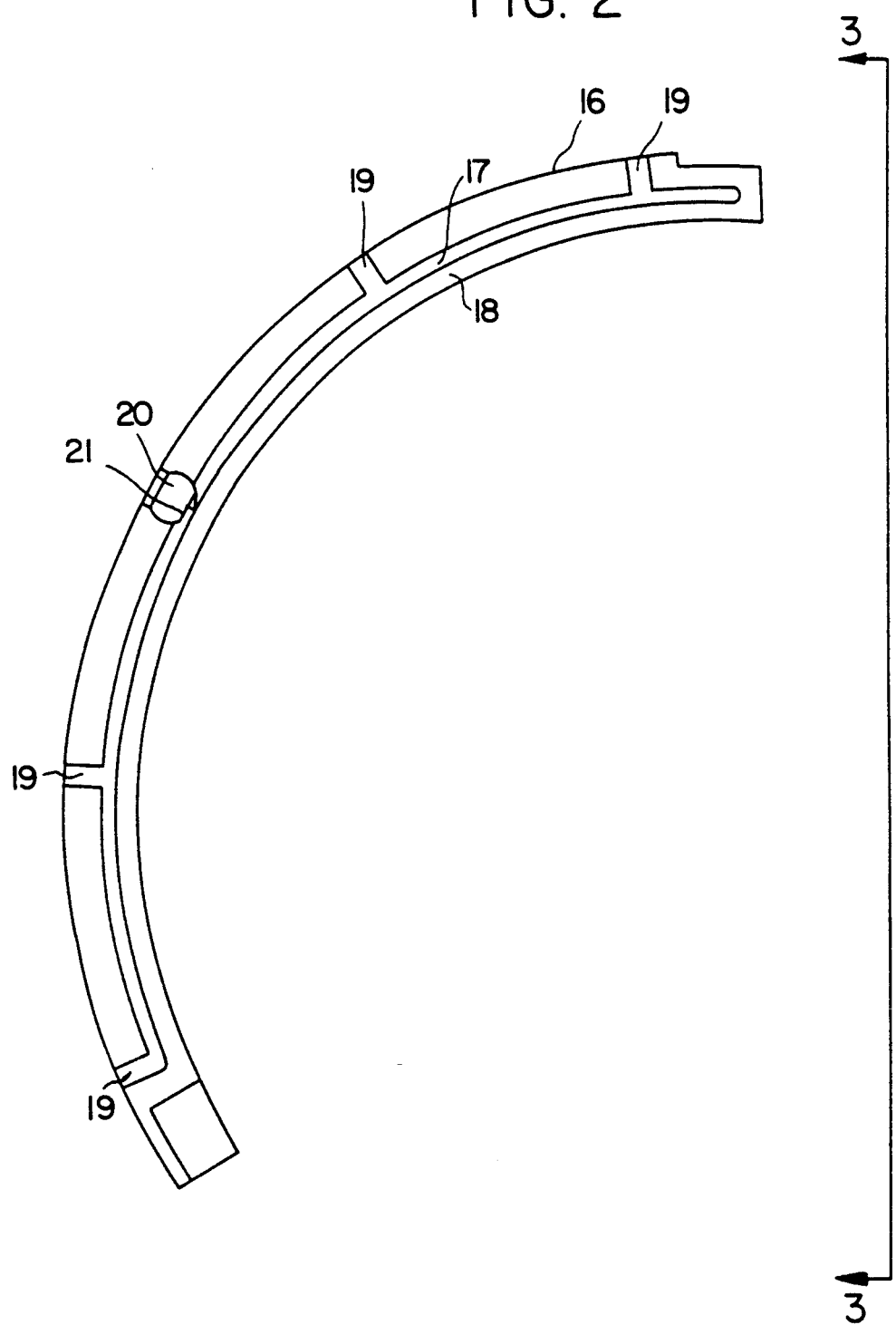

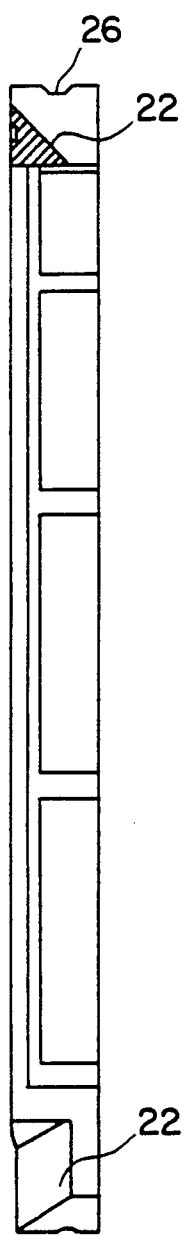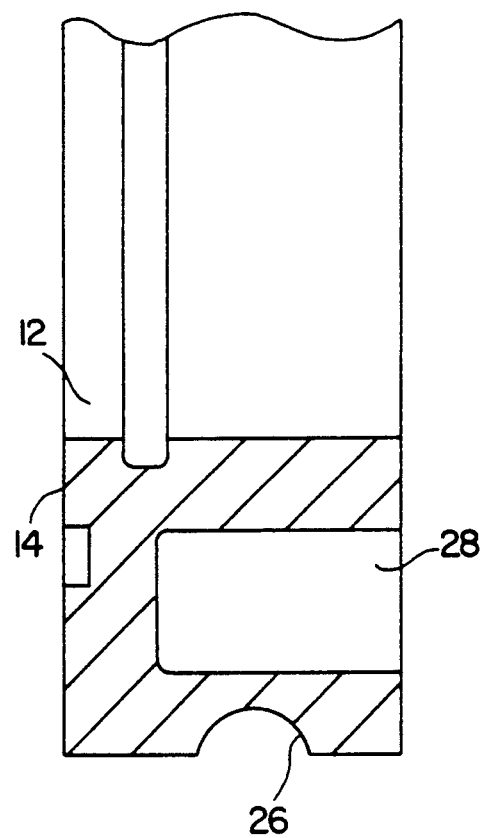

SELF-CONTAINED SEALING RING ASSEMBLY

BACKGROUND OF THE INVENTION

1. Field of the Invention

The invention relates to a segmented seal, and more specifically, to a self-contained seal ring assembly.

2. Description of Related Art

Segmented carbon seals are frequently used on main shafts of aircraft gas turbine engines or on other industrial gas turbines. Eventually, when the segmented seal wears sufficiently for overhaul and repair, the interior portions of a complete seal assembly are removed and then installed in pieces: coil springs, washers, retainers and the carbon seal ring segments. Where installation of these components is difficult due to the location of the seal housing within the engine, it may be necessary to remove a complete seal assembly at great expense. Furthermore, even if it is not necessary to remove the complete assembly, typical replacement times are on the order of 2-4 hours. When that repair time is projected over several thousand gas turbine engines, manpower maintenance expenses become significant.

SUMMARY OF THE INVENTION

It is an object of the present invention to provide a seal assembly which greatly reduces the time required for seal replacement. It is a further object of the invention to provide a seal assembly in which the pieces of the seal are contained in assembled order. It is still a further object of the invention to provide an assembly that allows for easy removal of the used seal.

To achieve the objects and in accordance with the purpose of the invention, as embodied and broadly described herein, the invention comprises a seal assembly for mounting into a housing around an application runner, the assembly comprising: a seal ring including a front radially-oriented sealing face; an annular outer shell surrounding the seal ring; means for holding the seal ring within the outer shell, the means including an annular retainer plate fit within the outer shell and behind the seal ring; and means for preventing the rotation of the seal ring relative to the annular outer shell.

Preferably, the seal ring includes a primary sealing surface being a radially-inner axially-oriented surface. Further preferably, the seal ring is made from a plurality of segments and the seal assembly further comprises a garter spring holding the segments together. Further preferably, the holding means comprises the annular retainer plate and a plurality of fingers fixed to the annular outer shell and projecting into pockets formed in the seal ring, and the means for preventing rotation comprises the plurality of fingers.

Additional objects and the advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention as claimed.

The accompanying drawings, which are incorporated in and constitute a part of this specification, illustrate an embodiment of the aspects and features of the invention, and together with the description, serve to explain the principles of the invention.

BRIEF DESCRIPTION OF THE DRAWINGS

FIG. 2 depicts one segment of the carbon seal ring of the present invention.

FIG. 3 depicts a side view of the carbon seal ring segment taken along the direction III—III shown in FIG. 2.

FIG. 4 depicts a cross-sectional view of the segmented carbon seal at a spring hole.

DESCRIPTION OF THE PREFERRED EMBODIMENT

Reference will now be made to the presently preferred embodiment and implementation of the invention, as illustrated in the accompanying drawings. Whenever possible, the same reference numbers will be used throughout the drawings to refer to the same or like parts.

Figure 1:
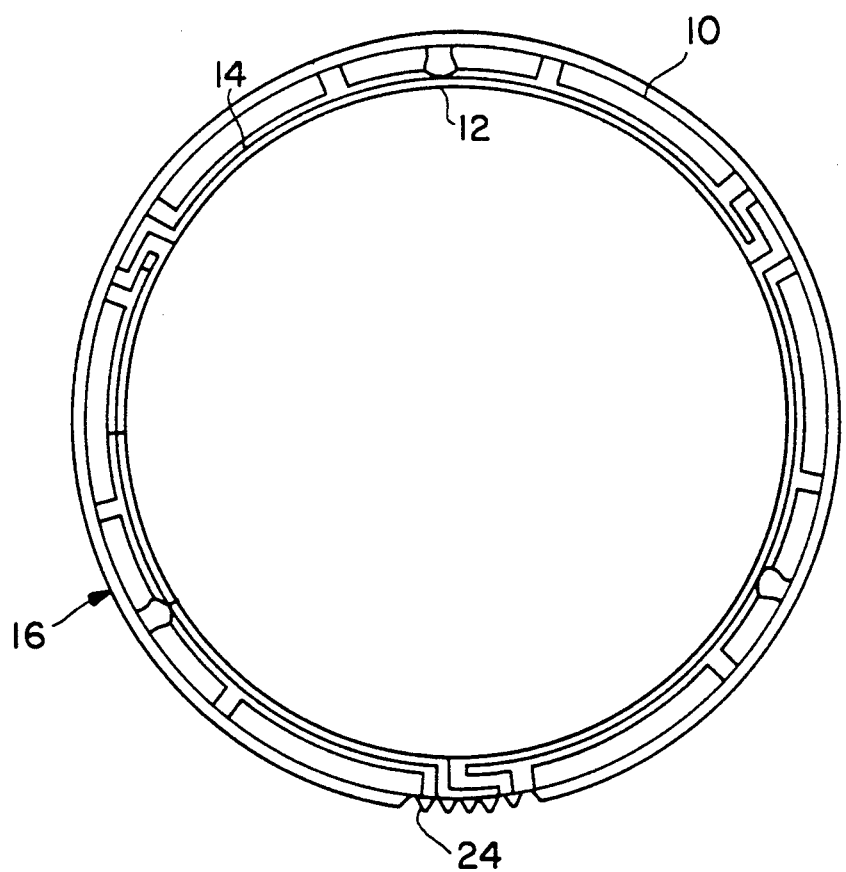
FIG. 1 depicts a segmented carbon seal ring made according to the present invention.
Figure 7:
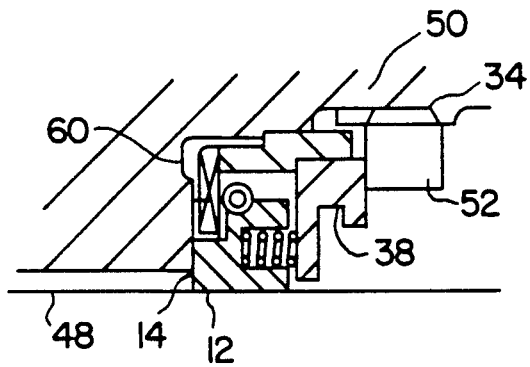
FIG. 7 depicts the assembly of the seal of the present invention after installation into a machined housing or gland, over a shaft.

A seal assembly of the invention includes a segmented carbon seal ring 10, shown in FIG. 1. The seal ring has as its primary sealing surface 12 the radially-inner surface or circumference of ring 10. As shown in FIG. 7, surface 12 seals against the application runner 48 (normally a shaft) when the seal is operating. Axially-front face 14 serves as a secondary sealing face against the machine housing into which the seal ring is installed.

As shown best in FIG. 1, the segmented seal is made up of multiple seal segments 16 (one of which is shown in FIG. 2) with a dam pattern ground on their sealing surfaces. The segments in the preferred embodiment are made from carbon. As shown in FIG. 2, the inner portion 18 of each seal segment creates sealing face 14 which serves as a dam to any leakage. Radially behind the inner portion 18, a relief channel 17 is formed in the face of the ring. The channel includes an arcuate portion formed in the middle of face and several radial relief channels 19. The arcuate portion of channel 17 does not extend over the entire length of the segment. As a result, each segment forms a dam along its entire length. Preferably, the number of segments 16 in the carbon seal ring 10 varies with the diameter of the ring. For example, a four (4) inch diameter seal ring is preferably constructed of three segments, while larger rings are preferably made of 4-6 segments.

As can be seen best from FIG. 3, each of the sealing segments have wedges 22 formed at each end. As shown generally in FIG. 1, when the segments are placed together to form a seal ring, the ends of the segments meet at wedge-shaped joints. The segments are then held in place by way of garter spring 24. The garter spring fits into groove 26 (best shown in FIG. 4)

which is formed on the exterior surface of the seal ring segment.

As shown in FIG. 4, each segment has a plurality of axially-oriented spring holes 28 formed in the seal ring surface opposite secondary sealing face 14. These holes serve to hold coil springs as will be discussed later. It is desirable to have two to three spring holes per segment. Furthermore, as shown in FIG. 2, each seal segment 16 has one or more pockets 20 formed in the outer circumference of the segment opposite sealing face 12.

Figure 5:
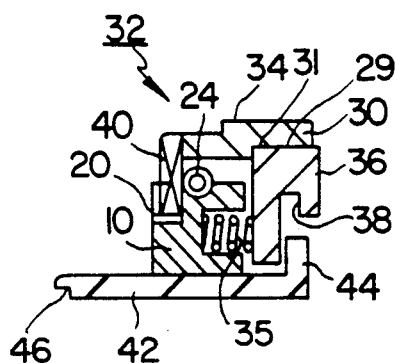
FIG. 5 depicts the assembly of the seal of the present invention prior to installation into a machined housing or gland, over a shaft.

In accordance with the invention, the seal assembly shown prior to installation generally as 32 in FIG. 5 includes an annular outer shell 30. The outer shell has a plurality of drive lugs 34 formed about its circumference. These drive lugs take the shape of axially-elongated elevations or ribs extending from the radially-outer surface or circumference of the shell.

In accordance with the invention, the seal assembly further includes an annular retainer plate 36 which is preferably press fitted into shell 30. As shown in FIG. 5, shell 30 has an inner annular recess 29 formed in its inner circumference, and the retainer plate 36 ultimately rests in recess 29 and fits against ledge 31 formed by the recess. As a result, the retainer plate 36 seats against ledge 31 and cannot slide beyond the ledge. As an alternative to press fitting, once the seal ring is in place within the shell 30, the retainer plate may le welded or attached by other means as known in the art. The retainer plate is annular in shape and extends from outer shell 30 radially inward past the point corresponding to spring holes 28 in the carbon segmented ring 10. Furthermore, the retainer plate is preferably designed with means for facilitating removal of the assembly which comprises a groove 38 into which a tool can be inserted for pulling on the seal assembly in order to remove it from around the shaft. Alternatively, puller threads may be formed in the retainer to allow it to be removed.

Coil springs 35 are placed in the spring holes in the segmented seal and rest against the retainer plate 36. These springs serve to seat the secondary sealing face 14 against housing 50 when the seal operates.

Figure 8:
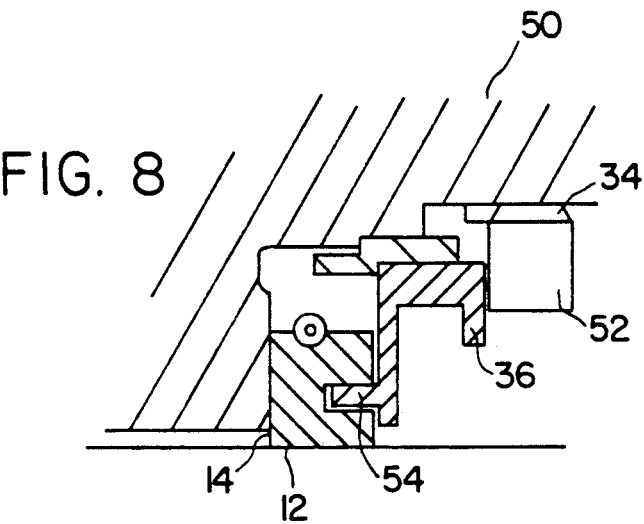
FIG. 8 depicts an alternative embodiment of the assembly of the seal of the present invention after installation into a machined housing or gland, over a shaft.

In accordance with the invention, means are provided for preventing the carbon segmented seal from rotating within the outer shell. Preferably, the means for preventing rotation comprises fingers 40 extending into pockets 20 formed in the seal ring segments. These fingers 40 are formed as part or fixed to the annular outer shell 30 (for example, by welding). As shown in FIG. 2, pocket 20 has a bulbously-shaped radially-inner area 21 which accepts an anti-rotation finger 40. The cooperating finger 40 and area 21 serve to lock the finger in place and maintain the ring at its free height. Alternatively, instead of fingers, round or blade pins 54 may be designed to extend from the retainer plate 36 and be pressed into the segmented seal ring, as shown in FIG. 8.

The invention also includes an installation sleeve to assist in the installation of the seal ring assembly. As shown in FIG. 5, installation sleeve 42 is annular and has an "L" shaped cross-section. The axially parallel portion of the "L" provides a surface on which the seal ring may slide. The axially-orthogonal portion 44 of the "L" provides an area which can be pulled in order to remove the sleeve after installation. Furthermore, the installation sleeve has a notch 46 in its front end which fits over application runner 48 during installation, as shown FIG. 6.

As seen in FIG. 5, the invention is assembled by attaching fingers 40 to shell 30, if that are not already formed as part of the shell. The seal segments 16 are assembled into seal ring 10, and garter spring 24 is placed around the segments. Then, coil springs 35 are placed in spring holes 28. Retainer plate 36 is now press fit or welded into shell 30. Finally, installation sleeve 42 is slid inside of seal ring 10. Garter spring 24 allows ring 10 to expand in order to accommodate the dimensions of sleeve 42.

Figure 6:
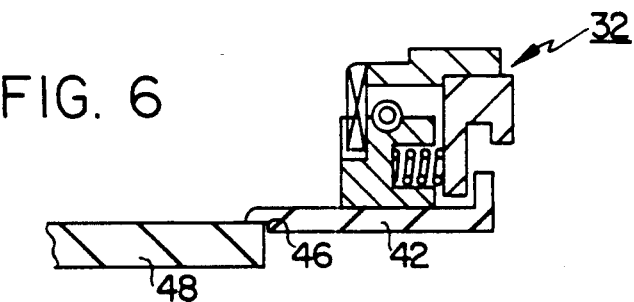
FIG. 6 depicts the assembly of the seal of the present invention during installation into a machined housing or gland, over a shaft.

In operation, as shown in FIG. 6, notch 46 of installation sleeve 42 is placed over application runner or shaft 48. The seal assembly shown generally as 32 is pushed forward onto shaft 48. Once the seal assembly is positioned on the shaft, the segments contract into place. As can be seen in FIG. 7, drive lugs 34 fit into drive lug recesses or retainers 50 formed in the machine housing, and the secondary sealing face 14 rests against the machine housing 50. A nut or other retainer 52 is secured to hold the seal assembly in place. The recesses and lugs are formed so that when the lugs are fully seated in the recesses, outer shell 30 and associated fingers 40 are axially spaced from the face 60 of the housing. Nut 52 places an axial force on retainer plate 36, and the retainer plate in turn presses outer shell 30 to the left and holds it in place. The segmented seal ring 10 presses against housing 50 and compresses springs 35 and thereby spaces the inside of pockets 20 from the rightside of fingers 40. Additionally, garter spring 24 is spaced from the shell 30. The seal ring, once installed, floats radially between fingers 40 and retainer plate 36.

If it is desired to remove the seal to replace it, nut or retainer 52 is removed and the entire assembly is pulled from the housing using groove 38. Then a new assembly can be put in place using an installation sleeve.

Use of an assembly according to the invention can reduce seal replacement time from the prior art 2-4 hours to less than 1 hour in virtually every case. Thus, substantial manpower savings are available with this invention.

It will be apparent to those skilled in the art that various modifications and variations could be made to the invention without departing from the scope or spirit of the invention.

Other embodiments of this invention will be apparent to those skilled in the art from consideration of the specification and practice of the invention disclosed herein. It is intended that the specification and examples be considered as exemplary only, with the true scope and spirit being indicated by the following claims.

What is claimed is;

1. A seal assembly for mounting into a housing around an application runner, the assembly comprising:
   a segmented seal ring having a radially-outer surface, a primary sealing face in the form of a radially-inner surface, a secondary sealing face at one axial end of said seal ring for sealing against the housing, and a plurality of holes formed in the other axial end of said seal ring;
   an annular outer shell surrounding said seal ring, said shell having at least one drive lug formed in an outer surface thereof, said drive lug adapted for slidably engaging said machine housing so that said shell will not rotate;
   an annular retaining plate fit within said outer shell and having a plate surface adjacent said holes formed in said seal ring; and a plurality of coil springs located in aid holes, said springs extending toward and resting against said plate surface.

2. The assembly as claimed in claim 1 further comprising means, associated with said retainer plate, for facilitating the removal of the assembly in order to replace the said seal.

3. The assembly as claimed in claim 2 wherein said means for facilitating the removal comprises an annular grove formed in said retainer plate, said groove adapted for being engaged for pulling.

4. The seal assembly, as claimed in claim 1, wherein a garter spring extends around said seal ring and pressingly engages said outer surface.

5. The assembly, as claimed in claim 2, further comprising at least one aperture formed in said seal ring, and a corresponding finger extending radially inward from said outer shell into said aperture.

6. An installation kit for mounting a seal ring into a housing around an application runner, the installation kit comprising:

a segmented seal ring made from a plurality of segments, and having a primary sealing face in the form of a radially - inner surface, and a secondary sealing face at one axial end of said seal ring for sealing against the housing;

a garter spring for holding said segments together, whereby the segmented seal ring can expand in diameter and resiliently return to its original size;

an annular outer shell surrounding said seal ring, said annular outer shell adapted for slidably engaging said housing so that said outer shell will not rotate;

means for holding said seal ring within said outer shell, said means including an annular retainer plate fit within said outer shell and behind said seal ring;

means for preventing the rotation of said seal ring relative to said annular outer shell; and an elongated annular installation sleeve over which the assembly of said seal ring, said annular shell and said annular retainer plate fit;

whereby the assembly can be slid from said installation sleeve onto the application runner where the segments of the seal ring form a continuous sealing face.

* * * * *